United States Patent [19]

Sawamura et al.

[11] Patent Number: 4,695,510
[45] Date of Patent: Sep. 22, 1987

[54] OPTO-MAGNETIC RECORDING MEDIUM

[75] Inventors: Mitsuharu Sawamura; Kazuoki Honguu, both of Yokohama; Kazuhiko Kikuchi, Kawasaki, all of Japan

[73] Assignee: Canon Kabushiki Kaisha, Tokyo, Japan

[21] Appl. No.: 767,867

[22] Filed: Aug. 21, 1985

[30] Foreign Application Priority Data

Aug. 28, 1984 [JP] Japan ................................ 59-177582

[51] Int. Cl.$^4$ ............................................. G11B 7/24
[52] U.S. Cl. .................................... 428/336; 429/472; 429/694; 429/702; 429/704; 429/900
[58] Field of Search ............... 428/469, 472, 694, 698, 428/702, 900, 704, 336; 365/122; 360/131, 135; 430/945

[56] References Cited

U.S. PATENT DOCUMENTS

| | | | |
|---|---|---|---|
| 4,544,443 | 10/1985 | Ohta et al. | 430/321 |
| 4,556,291 | 12/1985 | Chen | 365/122 |
| 4,631,617 | 12/1986 | Tanaka et al. | 428/694 |

FOREIGN PATENT DOCUMENTS 2558937  7/1976  Fed. Rep. of Germany .

OTHER PUBLICATIONS

Cuomo et al., "Antireflection Coatings for the Enhancement of Magneto-Optic Effects in Amorphous Rare Earth Transition Metal Alloys", IBM TDB, vol. 16, No. 5, Oct. 1973, p. 1442.

Primary Examiner—George F. Lesmes
Assistant Examiner—William M. Atkinson
Attorney, Agent, or Firm—Fitzpatrick, Cella, Harper & Scinto

[57] ABSTRACT

In an opto-magnetic recording medium having on a substrate at least a recording layer consisting of an amorphous magnetic material, there is provided between the substrate and the recording layer an undercoated layer comprising a silicon oxide film, a metal film and a nitride film laminated in succession from the substrate side.

9 Claims, 2 Drawing Figures

4,695,510

OPTO-MAGNETIC RECORDING MEDIUM

BACKGROUND AND SUMMARY OF THE INVENTION

This invention relates to improvements in an opto-magnetic recording medium which is used in an opto-magnetic memory, a magnetic recording and displaying element or the like and which can be read out by the use of the magneto-optical effect such as the magnetic Kerr effect or the Faraday effect.

As the recording layer of an opto-magnetic recording medium, there is known a polycrystal thin film such as MnBi or MnCuBi, an amorphous thin film such as GdCo, GdFe, TbFe, DyFe, GdTbFe, TbDyFe, GdFeCo, TbFeCo or GdTbCo, or a single crystal thin film such as GdIG.

Of these thin films, the amorphous thin film is recently considered excellent as the recording layer of the opto-magnetic recording medium with the film formability with which a thin film of large area is made at a temperature in the vicinity of room, temperature, the writing-in efficiency for writing signals at small opto-thermal energy and the readingout efficiency for reading out the written signals at a good S/N ratio being taken into account. Particularly, GdTbFe, which has a great Kerr rotation angle and a curie point of about 150° C., is best suited as the material for the opto-magnetic medium.

However, amorphous magnetic materials including GdTbFe have a disadvantage that they are generally inferior in corrosion resistance and tend to be corroded in an atmosphere having moisture and their magnetic characteristic is deteriorated. If an element such as Si, Cr or Ti is added to the amorphous magnetic material to overcome such disadvantage, the corrosion resistance will be improved, but instead there will occur a disadvantage that the curie point is elevated and the recording sensitivity is reduced.

To eliminate such disadvantage, there have heretofore been proposed disk-like opto-magnetic recording mediums of the type in which various protective layers are provided on a recording magnetic layer of amorphous magnetic material, or of the air sandwich structure in which the recording magnetic layer is enveloped by inert gas, or of the cemented structure in which a substrate is further provided on the recording magnetic layer with an adhesive agent interposed therebetween.

As said protective layer, there is, for example, a thin film of an oxide such as $SiO_2$, SiO or $Al_2O_3$, a thin film of a metal such as Ti, Cr, Al or Si, or a thin film of a nitride such as AlN or $Si_3N_4$.

However, where the magnetic recording layer is as thin as up to several hundred Å, the effect of improving the durability by a thin film of oxide is not sufficient. Also, a thin film of nitride is inferior to oxides in the adhesion property with respect to the substrate, particularly plastic substrate, and has a further disadvantage that it is too high in refractive index.

It is an object of the present invention to provide an opto-magnetic recording medium using an amorphous magnetic material which is improved in corrosion resistance and durability and in which the writing-in efficiency and the reading-out efficiency can also be improved.

Such object is achieved by an opto-magnetic recording medium having on a substrate at least a recording layer consisting of an amorphous magnetic material and wherein an under-coated layer comprising a silicon oxide film, a metal film and a nitride film laminated in succession from the substrate side is provided between said substrate and said recording layer.

The present invention is particularly suitable for a case where said substrate is plastic.

Also, in the present invention, the silicon oxide film is an SiO or $SiO_2$ film. As the metal used in the metal film, mention may be made of Si, Cr, Ni, Ti, Al or the like. As the nitride forming the nitride film, mention may be made of $Si_3N_4$, AlN, BN or the like.

By the use of the above-mentioned materials, the silicon oxide film is formed to a thickness of 500Å–2000Å, preferably of 500Å–1000Å, the metal film is formed to a thickness of 20Å–100Å, preferably of 20Å–40Å, and the nitride film is formed to a thickness of 200Å–1000Å, preferably of 200Å–400Å.

The forming method may be sputtering, vacuum evaporation or the like.

DESCRIPTION OF THE PREFERRED EMBODIMENTS

Figure 1:
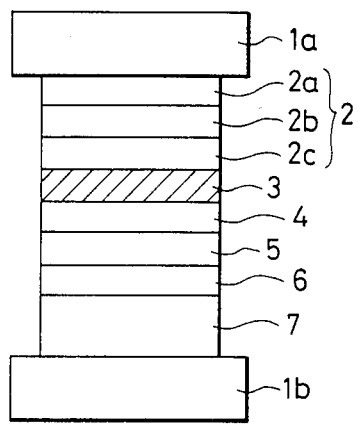
FIG. 1 is a schematic cross-sectional view of an embodiment of the opto-magnetic recording medium of the present invention.

A schematic cross-sectional view of an embodiment of the opto-magnetic recording medium of the present invention is shown in FIG. 1.

In FIG. 1, there are laminated in succession from above a write-in side substrate 1a, an under-laid layer 2 comprising, in succession from the write-in side substrate 1a side, a silicon oxide film 2a, a metal film 2b and a nitride film 2c, a recording layer 3 consisting of an amorphous magnetic material, a spacer layer 4, a reflecting film 5, a protective layer 6, an adhesive layer 7 for adhesively securing a protective substrate 1b to the protective layer 6, and a protective substrate 1b.

If, as described above, the silicon oxide film 2a which has a good adhesion property with respect to a substrate, particularly a plastic substrate, is provided in contact with the write-in side substrate 1a, film cracks can be prevented and the durability of the recording medium can be improved. The metal film 2b and the nitride film 2c successively provided on the silicon oxide film 2a have a moisture-proof action even if each of them is a single layer, but by laminating these films into a plurality of layers, the moisture-proof property can be further enhanced to prevent corrosion of the recording layer 3. Further, the metal film 2b and the nitride film 2c each have a function as an antireflection film and thus, it is possible to achieve the improvement of the writing-in efficiency and the improvement of the reading-out efficiency by an increase in Kerr rotation angle.

Although glass plastic or the like can be used for the substrate 1a, a transparent plastic disk substrate of acrylic resin having a thickness of the order of 1 mm is preferred.

For example, a three-element amorphous film of GdTbFe having a thickness of about 200Å or a four-element amorphous film of GdTbFeCo having a thickness of about 200Å is preferred as the recording magnetic layer 3.

An $SiO_2$ or SiO film having a thickness of the order of 500Å–3000Å or a nitride film similar to the above-described layer 2c is preferred as the spacer layer 4 disposed between the recording magnetic layer 3 and the reflecting film 5 to enhance the intensity of light by an interference action and improve the writing-in efficiency and the reading-out efficiency.

As the reflecting film 5, use may preferably be made of an Al film or a Cu film having a thickness of the order of 500Å–1000Å to secure a sufficient reflectance.

As the protective layer 6, use may preferably be made of an $SiO_2$ or SiO film having a thickness of the order of 500Å–3000Å or a nitride film similar to the above-described film 2c from the viewpoints of a sufficient protecting effect and prevention of the occurrence of film cracks.

As the adhesive layer 7, a silicone adhesive agent such as, for example, SE1700 produced by Tore Silicone Co., Ltd., may be employed at a thickness of the order of 10 μm.

Although glass or plastic can be used for the protective substrate 1b, an acrylic resin substrate or the like may preferably be used like the substrate 1a.

Some examples will hereinafter be shown to describe the present invention more specifically.

EXAMPLE 1

The opto-magnetic recording medium shown in FIG. 1 was manufactured in the following manner.

An acrylic resin substrate having a thickness of 1.2 mm was used as the write-in side substrate 1a. On the substrate 1a, an $SiO_2$ film as the silicon oxide film 2a constituting the under-coated layer 2 was first provided to a thickness of 1000Å by sputtering. An Si film as the metal film 2b was then provided to a thickness of 40Å by sputtering. Subsequently, an $Si_3N_4$ film as the nitride film 2c was provided to a thickness of 400Å by sputtering. Thereon, a film of GdTbFeCo was formed to a thickness of 200Å by sputtering by the use of a high frequency sputtering apparatus, whereby the recording layer 3 was formed. Subsequently, an $SiO_2$ film as the spacer layer 4 was provided to a thickness of 700Å by sputtering, and then Al was evaporated to a thickness of 500Å by electron beam heating by the use of a vacuum evaporation apparatus, whereby the reflecting film 5 was provided. The protective layer 6 was formed by vacuum-evaporating $SiO_2$ to a thickness of 2000Å. Thereon, the protective substrate 1b of acrylic resin having a thickness of 1.2 mm was adhesively secured with a silicone adhesive agent(tradename: SE 1700, produced by Tore Silicone Co., Ltd.) As the adhesive layer 7 having a thickness of 10 μm.

The opto-magnetic recording medium thus manufactured was placed into a thermo-hygrostat of 45° C. and relative humidity of 95% and was left therein for 500 hours, whereby a corrosion resistance test was carried out. When the appearance of the recording medium was observed by naked eyes after the test, no variation was recognized and the coercive force and the Kerr rotation angle of the recording medium were 90% or more of their initial values.

For the purpose of comparison, an opto-magnetic recording medium similar to Example 1 with the exception that the under-coated layer was not provided was manufactured and a corrosion resistance test was carried out on this recording medium at the same time. The result was that in the observation of the appearance, creation of numerous pin-holes was recognized and the coercive force and the Kerr rotation angle both were 30% or less of their initial values.

Figure 2:
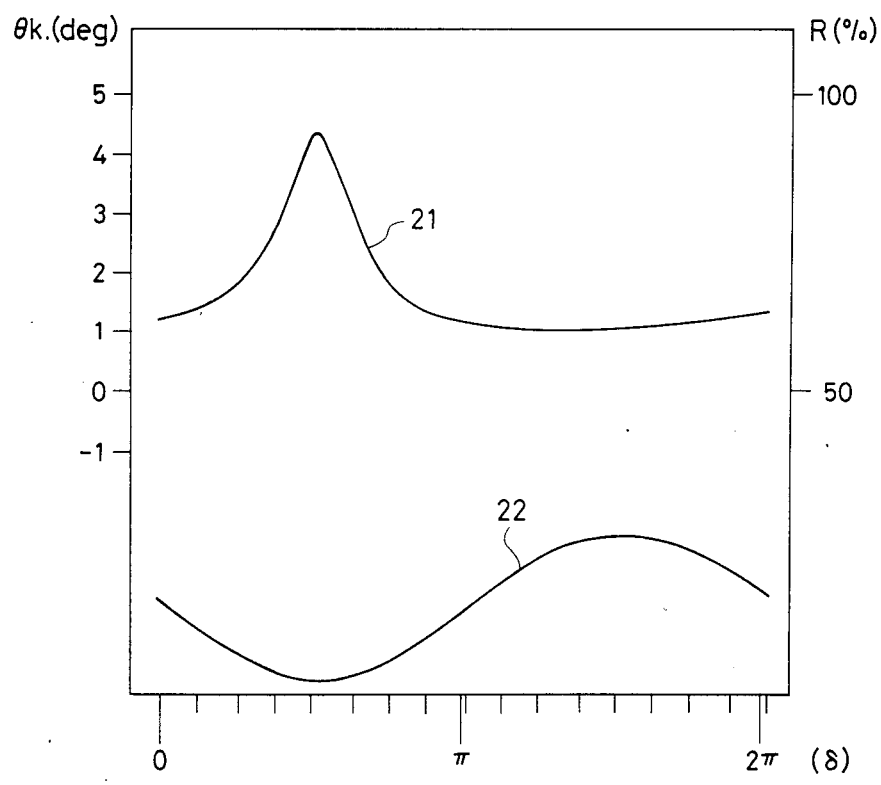
FIG. 2 is a graph showing the variations in Kerr rotation angle and reflectance when in the optomagnetic recording medium of the present invention, the film thickness of the nitride film in the undercoated layer is varied.

The adhesion property of the under-coated layer of the manufactured recording medium with respect to the substrate thereof was strong and since the film thickness of the Si layer provided by the metal film 2b was small, the quantity of light absorbed thereby was up to several % for a light of wavelength 6328Å and up to the order of 1% for a light of wavelength 8200Å. Also, by using a thin layer of Si, the effect of an increase in Kerr rotation angle was remarkable. In FIG. 2, the variations in Kerr rotation angle $\theta k$ and reflectance R when the film thickness of the $Si_3N_4$ layer forming the under-coated layer was varied are indicated by solid lines 21 and 22, respectively. The film thickness is shown as a wavelength phase. Except the thickness of the $Si_3N_4$ film, the film thickness of the $Si_3N_4$ film, the film thicknesses of the under-coated layer ($SiO_2$ layer and Si layer), the recording layer, the spacer layer, the reflecting layer and the protective layer are as previously mentioned. By the anti-reflection effect, an increase of the order of maximum 4° in Kerr rotation angle could be achieved and the writing-in efficiency and the reading-out efficiency could also be improved.

EXAMPLE 2

An opto-magnetic recording medium similar to Example 1 with the exception that a Cr film was formed to a thickness of 20Å instead of the Si film as the metal film 2b in the under-coated layer 2 of Example 1 was manufactured.

In the recording medium thus manufactured, the quantity of absorbed light was up to the order of 3% for both of a light of wavelength 6328Å and a light of wavelength 8200Å. The result of a corrosion resistance test carried out on this recording medium similarly to Example 1 was that no corrosion was recognized by the naked eye observation and the coercive force and the Kerr rotation angle were 90% or more of their initial values. Further, as in Example 1, the improvement of the writing-in efficiency and the reading-out efficiency was obtained.

We claim:
1. An opto-magnetic recording medium comprising:
a plastic substrate at least substantially transparent to light;
a recording layer consisting of an amorphous magnetic material;
an under-coated layer comprising a silicon oxide film, a metal film at least substantially transparent to light and a nitride film laminated in succession from the substrate side between said substrate and said recording layer; and
a protective overcoat formed on the side of said recording layer opposite the side on which said under-coated layer is formed.

2. An opto-magnetic recording medium according to claim 1, wherein said recording layer is formed of GdTbFe or GdTbFeCo.

3. An opto-magnetic recording medium according to claim 1 wherein said protective overcoat is formed from a spacer layer, a reflecting film, a protective layer, an adhesive layer and a protective substrate which are laminated in succession from the recording layer side.

4. An opto-magnetic recording medium according to claim 1, wherein said silicon oxide film is formed of $SiO_2$ or $SiO$.

5. An opto-magnetic recording medium according to claim 1, wherein said metal film is formed of Si, Cr, Ni, Ti or Al.

6. An opto-magnetic recording medium according to claim 1, wherein said nitride film is formed of $Si_3N_4$, AlN or BN.

7. An opto-magnetic recording medium according to claim 4, wherein the thickness of said silicon oxide film is 500Å to 1000Å.

8. An opto-magnetic recording medium according to claim 5, wherein the thickness of said metal film is 20Å to 40Å.

9. An opto-magnetic recording medium according to claim 6, wherein the thickness of said nitride film is 200Å to 400Å.

* * * * *